(12) United States Patent
Forbes, Jr. et al.

(10) Patent No.: US 10,899,235 B2
(45) Date of Patent: Jan. 26, 2021

(54) SYSTEMS AND METHODS FOR ELECTRIC VEHICLE CHARGING AND USER INTERFACE THEREFOR

(71) Applicant: Causam Energy, Inc., Raleigh, NC (US)

(72) Inventors: Joseph W. Forbes, Jr., Raleigh, NC (US); Nathaniel Taylor Brockman, Mt. Pleasant, SC (US); Jinan Glasgow George, Durham, NC (US)

(73) Assignee: CAUSAM ENERGY, INC., Raleigh, NC (US)

( * ) Notice: Subject to any disclaimer, the term of this patent is extended or adjusted under 35 U.S.C. 154(b) by 1001 days.

(21) Appl. No.: 14/587,557

(22) Filed: Dec. 31, 2014

(65) Prior Publication Data

US 2015/0183333 A1 Jul. 2, 2015

Related U.S. Application Data

(60) Provisional application No. 61/923,115, filed on Jan. 2, 2014.

(51) Int. Cl.
| | | |
|---|---|---|
| *G06Q 10/02* | (2012.01) | |
| *B60L 11/18* | (2006.01) | |
| *G06Q 30/02* | (2012.01) | |
| *G06Q 20/14* | (2012.01) | |
| *G06Q 50/06* | (2012.01) | |
| *G07F 15/00* | (2006.01) | |
| *B60L 53/65* | (2019.01) | |
| *B60L 53/66* | (2019.01) | |

(52) U.S. Cl.
CPC .......... *B60L 11/1846* (2013.01); *B60L 53/65* (2019.02); *B60L 53/665* (2019.02); *G06Q 10/02* (2013.01); *G06Q 20/145* (2013.01); *G06Q 30/0259* (2013.01); *G06Q 50/06* (2013.01); *G07F 15/005* (2013.01); *B60L 2250/10* (2013.01); *B60L 2250/16* (2013.01); *Y02T 10/70* (2013.01); *Y02T 10/7072* (2013.01); *Y02T 90/12* (2013.01); *Y02T 90/14* (2013.01); *Y02T 90/16* (2013.01); *Y02T 90/167* (2013.01); *Y04S 30/14* (2013.01)

(58) Field of Classification Search
None
See application file for complete search history.

(56) References Cited

U.S. PATENT DOCUMENTS

| | | |
|---|---|---|
| 2008/0177678 A1 | 7/2008 | Martini et al. |
| 2010/0045232 A1 | 2/2010 | Chen et al. |
| 2010/0094496 A1* | 4/2010 | Hershkovitz ............ B60L 3/12 701/22 |
| 2010/0161479 A1 | 6/2010 | Littrell et al. |
| 2010/0306033 A1 | 12/2010 | Oved et al. |
| 2011/0202418 A1* | 8/2011 | Kempton ............ B60L 11/1824 705/26.1 |
| 2011/0276448 A1 | 11/2011 | Perper et al. |
| 2012/0116955 A1 | 5/2012 | Prosser et al. |

(Continued)

*Primary Examiner* — Tonya Joseph
(74) *Attorney, Agent, or Firm* — Neo IP

(57) ABSTRACT

Systems and methods for electric vehicle (EV) charging and graphic user interface for consumers, including consumer profiles and EV point of sale terminal profiles. Novel methods for consumer guidance and controls are provided coupled with graphic user interfaces for mobile applications, websites, and electric vehicle point of sale terminals.

30 Claims, 8 Drawing Sheets

(56) References Cited

U.S. PATENT DOCUMENTS

| | | | | |
|---|---|---|---|---|
| 2012/0256588 A1* | 10/2012 | Hayashi | ............... | B60L 3/12 |
| | | | | 320/109 |
| 2013/0151293 A1* | 6/2013 | Karner | ............... | G06Q 20/102 |
| | | | | 705/5 |
| 2014/0085110 A1* | 3/2014 | Scofield | ............... | G07B 15/04 |
| | | | | 340/932.2 |
| 2017/0101025 A1* | 4/2017 | Penilla | ............... | B60L 58/21 |

* cited by examiner

Electric Vehicle Parking Consumer Brand

REFUELR
TESSLR
CRGSPOT
9STATION

Fuel Mix: 100% renewable or blend by user profile:

87  Least expensive power source for vehicle.

91  Hybrid of cost & renewable energy sources.

93  Greenest power source available.

Tagline:  Guaranteed parking in advance and on the go!

Included with Reservation

Mobile Smartphone Application

Find a Station

Reserve a Station

Arrive at your Station

Enjoy your Parked time

View your Account

SYSTEMS AND METHODS FOR ELECTRIC VEHICLE CHARGING AND USER INTERFACE THEREFOR

CROSS-REFERENCES TO RELATED APPLICATIONS

This application claims priority from U.S. Provisional Patent Application No. 61/923,115, filed Jan. 2, 2014, which is incorporated herein by reference in its entirety.

BACKGROUND OF THE INVENTION

1. Field of the Invention

The present invention relates to electric vehicles, and more particularly, to electric vehicle charging and graphic user interface for consumers.

2. Description of the Prior Art

Generally, it is known in the prior art to provide electric vehicle (EV) charging in a private residence and/or public setting. However, private residence charging stations for EVs require energy financial settlements to be automatically included in the utility billing associated with the fixed location of the residence; public charging stations require payment by credit card or other electronic payment method at the time of charging and do not associate with the consumer's utility billing at all. Furthermore, public charging station locations are not readily identifiable or locatable via independent mobile devices, network-based communication via websites, or global positioning system (GPS) navigation systems included within the EVs themselves. Thus, there remains a need for improved information and controls for consumers for EV charging and management of financial settlement therefor.

Examples of relevant prior art patent or patent application documents include the following:

U.S. Publication No. 2012/0116955 for "Charging purchases to utility accounts," filed Nov. 4, 2010, describes charging purchases to utility accounts including a computer program product that stores instructions for implementing a method. Further, it describes that the method includes receiving a request from a consumer at an electric vehicle charging station to charge at least one of a purchase of electrical power for electric vehicle (EV) charging and an item other than electrical power to an electrical power utility account. The method also determines if the consumer is authorized to charge the purchase to the electrical power utility account. A transaction denied message is transmitted to the consumer in response to determining that the consumer is not authorized to charge the purchase to the electrical power utility account. Additionally, the document describes that the method includes, in response to determining that the consumer is authorized to charge the purchase to the electrical power utility account; charging the purchase to the electrical power utility account; and transmitting a transaction completed message to the consumer.

U.S. Publication No. 2010/0306033 for "Electrical power metering and billing network," filed May 20, 2010, describes a method and system for facilitating the purchase of electricity between static provider and dynamic/mobile customer, and describes that the system can create open-market, real-time rate and cost determinations based on the conditions of a Charging Instance and other electricity transfers. In an embodiment, the invention can provide a Transaction Center configured to receive Charging Instance information over communications links.

U.S. Publication No. 2010/0045232 for "Modularized interface and related method for connecting plug-in electric vehicles to the energy grid," filed Nov. 5, 2008, describes a modularized interface for connecting a plug-in electric vehicle to the energy grid, including a modularized interface for connecting a plug-in electric vehicle to the energy grid comprising: a module integrated within or configured to be connected to a charging interface on the vehicle.

U.S. Publication No. 2011/0276448 for "Plug-in hybrid and electric behicle charging system," filed May 5, 2011, describes an invention is described that enables a vehicle's electrical energy storage devices to charge in parking areas in which components of this invention are installed. The amount of energy consumed, combined with the amount charged are the components of a transaction. An embodiment allows the vehicle owner to have the cost of the energy consumed charged to his home electric bill. Another embodiment allows the vehicle owner to have the cost of the energy consumed charged to his home electric bill by recording his personal identification number at a kiosk or other input device co-locate at the parking area.

U.S. Publication No. 2010/0161479 for "Systems and methods for prepaid electric metering for vehicles," filed Dec. 22, 2008, describes a method for delivering energy to an electric vehicle is provided, wherein the electric vehicle is associated with a customer account. The method includes identifying the electric vehicle at an energy delivery point, and determining a current balance of the customer account, wherein the current balance includes at least a portion of a prepayment amount based on a predetermined amount of energy to be delivered to the electric vehicle at the energy delivery point.

SUMMARY OF THE INVENTION

The present invention relates to electric vehicle (EV) charging and management including systems and methods for electric vehicle (EV) charging and graphic user interface for consumers with consumer profiles and EV point of sale terminal profiles. Methods for consumer guidance and controls are provided, and coupled with graphic user interfaces for mobile applications, websites, and electric vehicle point of sale terminals.

The present invention provides for systems, methods, and graphic user interface embodiments for EV charging information, management, financial settlements, and charging terminals as described herein.

These and other aspects of the present invention will become apparent to those skilled in the art after a reading of the following description of the preferred embodiment when considered with the drawings, as they support the claimed invention.

DETAILED DESCRIPTION

Figure 1:
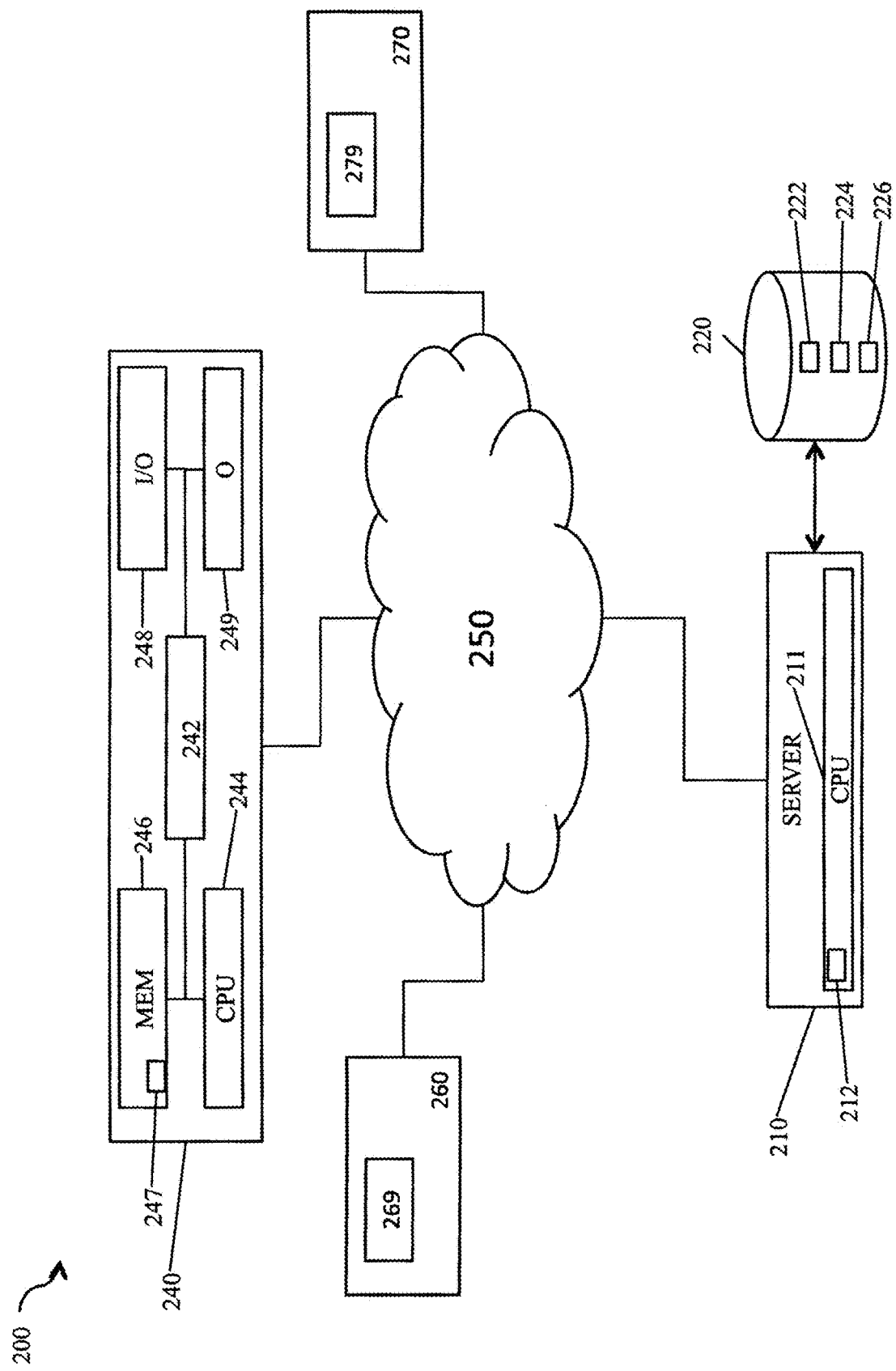
FIG. 1 illustrates a schematic diagram of an embodiment showing a configuration for a virtualized computing system for EV consumer interface with the systems of the present invention.
Figure 2A:
FIGS. 2A-2F illustrate several graphic user interface screen shots for one embodiment of the invention.
Figure 2B:
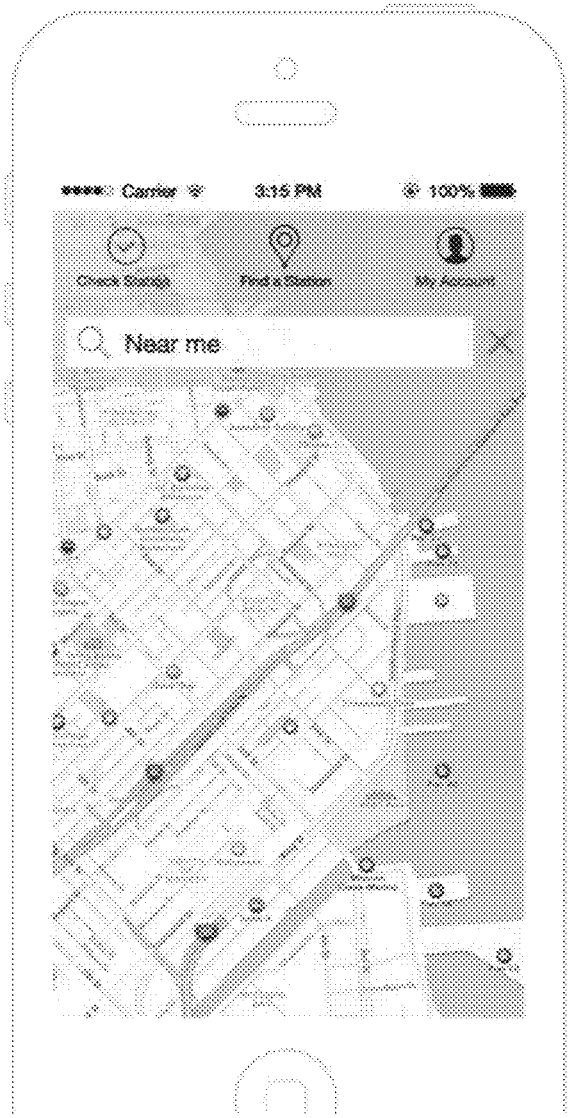
Figure 2C:
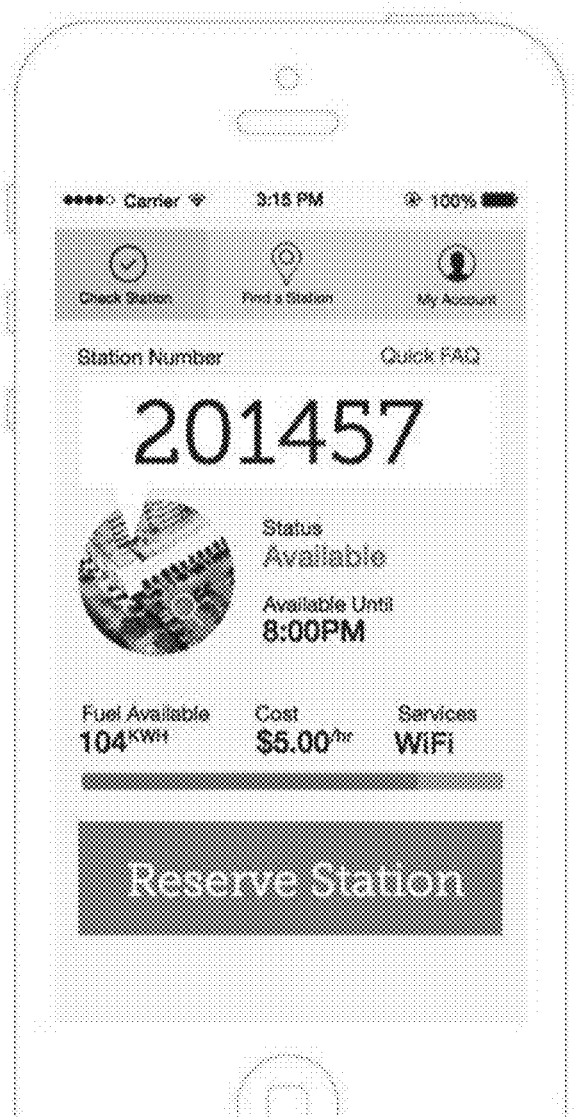
Figure 2D:
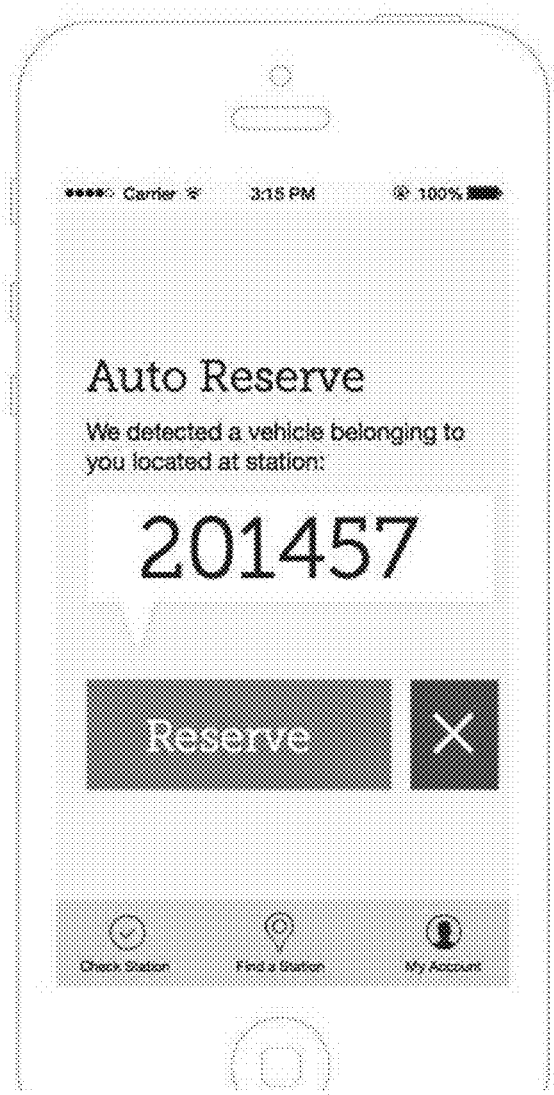
Figure 2E:
Figure 2F:

Referring now to the drawings in general, the illustrations are for the purpose of describing a preferred embodiment of the invention and are not intended to limit the invention thereto.

The present invention provides systems and methods for electric vehicle (EV) charging and graphic user interface for consumers, including consumer profiles and EV point of sale terminal profiles. Novel methods for consumer guidance and controls are coupled with graphic user interfaces for mobile applications, websites, and electric vehicle point of sale terminals that provide improved information and controls for consumers for EV charging and management of financial settlement therefor.

The present invention includes a graphic user interface (GUI) for EV information and/or controls wherein the GUI is provided for mobile applications, websites, EV interfaces, and combinations thereof. For mobile applications, one embodiment includes a mobile communication computer device, such as a smartphone, having a smartphone application including software operable on a processor coupled with memory, wherein the smartphone is constructed and configured for network-based communication. Preferably, the EV charging terminals for the present invention are also constructed and configured for network-based communication, more preferably wireless communication for providing smartphone, computer, EV and/or other mobile device connectivity with a data and communications network, such as the Internet. In one embodiment, a smartphone application (app) automatically provides information via the smartphone GUI associated with the app to indicate to the user (consumer) information about EV charging stations, including but not limited to their location, the price for charging on any per unit or total charge basis, the availability of the EV charging station for charging for a duration and/or at a predetermined time, and combinations thereof. Also, preferably the app GUI provides additional information including marketing and advertising information about any merchants associated with or proximal to the EV charging terminal(s). Also preferably, the app GUI provides an interactive interface allowing inputs to be received for making a reservation for charging an EV at the EV charging terminal. In one embodiment of the present invention, the reservation is associated with a consumer or user profile that is stored on the smartphone and/or in a database associated with a server computer or cloud-based computing system.

In a virtualized or cloud-based computing system and methods of the present invention, the following components are provided as illustrated by way of example and not limitation in FIG. 1. FIG. 1 is a schematic diagram of one embodiment of the present invention, illustrating components of a cloud-based computing system and network for distributed communication therewith by mobile communication devices. FIG. 1 illustrates an exemplary virtualized computing system for embodiments of the present invention loyalty and rewards platform. As illustrated in FIG. 1, a basic schematic of some of the key components of a virtualized computing (or cloud-based) system according to the present invention are shown. The system 200 comprises a server computer 210 with a processing unit 211. The server 210 is constructed, configured and coupled to enable communication over a network 250. The server provides for user interconnection with the server over the network using a remote computer device or a personal computer (PC) or smartphone, tablet computer, etc. 240 positioned remotely from the server. Furthermore, the system is operable for a multiplicity of remote personal computers or terminals 260, 270 for example, in a client/server architecture, as shown. Alternatively, a user may interconnect through the network 250 using a user device such as a personal digital assistant (PDA), mobile communication device, such as by way of example and not limitation, a mobile phone, a cell phone, smart phone, tablet computer, laptop computer, netbook, a terminal, or any other computing device suitable for network connection. Also, alternative architectures may be used instead of the client/server architecture. For example, a computer communications network, or other suitable architecture may be used. The network 250 may be the Internet, an intranet, or any other network suitable for searching, obtaining, and/or using information and/or communications. The system of the present invention further includes an operating system 212 installed and running on the server 210, enabling server 210 to communicate through network 250 with the remote, distributed user devices. The operating system may be any operating system known in the art that is suitable for network communication.

FIGS. 2A-2F display screen shot GUI illustrations showing various views of the information and interactive user interface on a one smart phone embodiment.

The consumer or user profile preferably includes a unique user identifier or identification, such as, by way of example and not limitation, a username and password. Further information is preferably provided, including an EV identifier, user financial account information, utility account information, geodetic information such as EV and/or smartphone location identifier (such as GPS-based location information, RFID, and/or near-field communication identifier), which is preferably communicated wirelessly to the server computer and/or processor with memory associated with the EV charging terminal, and/or communicated with user of optical bar code, QR code, etc. Additional information may optionally be associated and/or stored with the consumer profile and/or EV profile, and communicated via the network, including historical data relating to EV charging, EV location and mileage, EV status, EV systems, smartphone transactions relating to EV and/or non-EV activities, and combinations thereof. A message included with the GUI preferably includes information about the location of the closest EV charging terminal, and the corresponding rate for charging; additional advertising may be provided via the GUI. Preferably, market pricing conditions via a customer profile that can be loaded to a smart phone, tablet, or any web-enabled appliance for accepting or modifying a profile or moreover a profile that automated controls based upon previously selected economic messages. In a further embodiment, energy consumption patterns within active grid elements profiles could be used to identify opportunities for up selling, down selling, or cross selling. These opportunities may be determined by the power utility or by its partners. Data from active grid elements profiles may be used to provide insights on inefficient devices, defective devices, or devices that require updating to meet current standards. Active grid elements profiles data, individually or collectively (or selectively) in the aggregate, may also be used to identify related power grid participation opportunities.

The EVs function like active grid elements within an electric power grid (or off the grid in alternative embodiments) and receive information automatically through a plurality of methods utilizing IP-based communications methods and web based devices such as smart phones, computers, text messages, paging messages, or even voice response units or live customer service agents. Under a real time scenario, active grid elements could dynamically "Opt In" to a pre-determined profile or "Opt Out" or more importantly change the profile dynamically to take advantage of real time market pricing of electricity being sold by the utility, market participant, REP or any entity authorized to buy, sell and trade electric commodity or demand response products on behalf of the owner. Control activity also available for analysis. Event-based messaging is also provided. The systems and methods of the present invention further provide for Analyzing the control activity, responses to the controls (for example like Google adwords so that when a marketing message is provided, then there is compensation for the messaging like Google adwords), e.g., least cost closest EV charging terminal; whoever plugs in also is preferably connected to the financial settlement network associated with the mobile app and/or EV charging terminal, which may further include a marketing database, so that as the consumer user plug their app in, then the system has details of the information including the user profile and EV profile. The system includes payment to clear the messages, and for delivering the marketing message, and the analytics over the marketing message.

In one embodiment of the present invention, the EV app and GUI provide for targeted mobile advertising to the user or consumer based upon the consumer profile, in particular where the consumer has authorized information to be shared or used for purposes other than for EV charging at any given time.

While the foregoing description of preferred embodiments illustrates the applications for EVs as automobiles, the present invention further includes other EV applications, including but not limited to trucks, transport vehicles, boats and boat marinas, and the like, and mobile battery charging for portable storage of electric power. Also, the present invention for EV automobiles applies to private residence and private parking facilities, as well as public EV charging including but not limited to hotels, public parking slips or spots, public parking in garage settings, corporate, event venues, etc.

Figure 3:
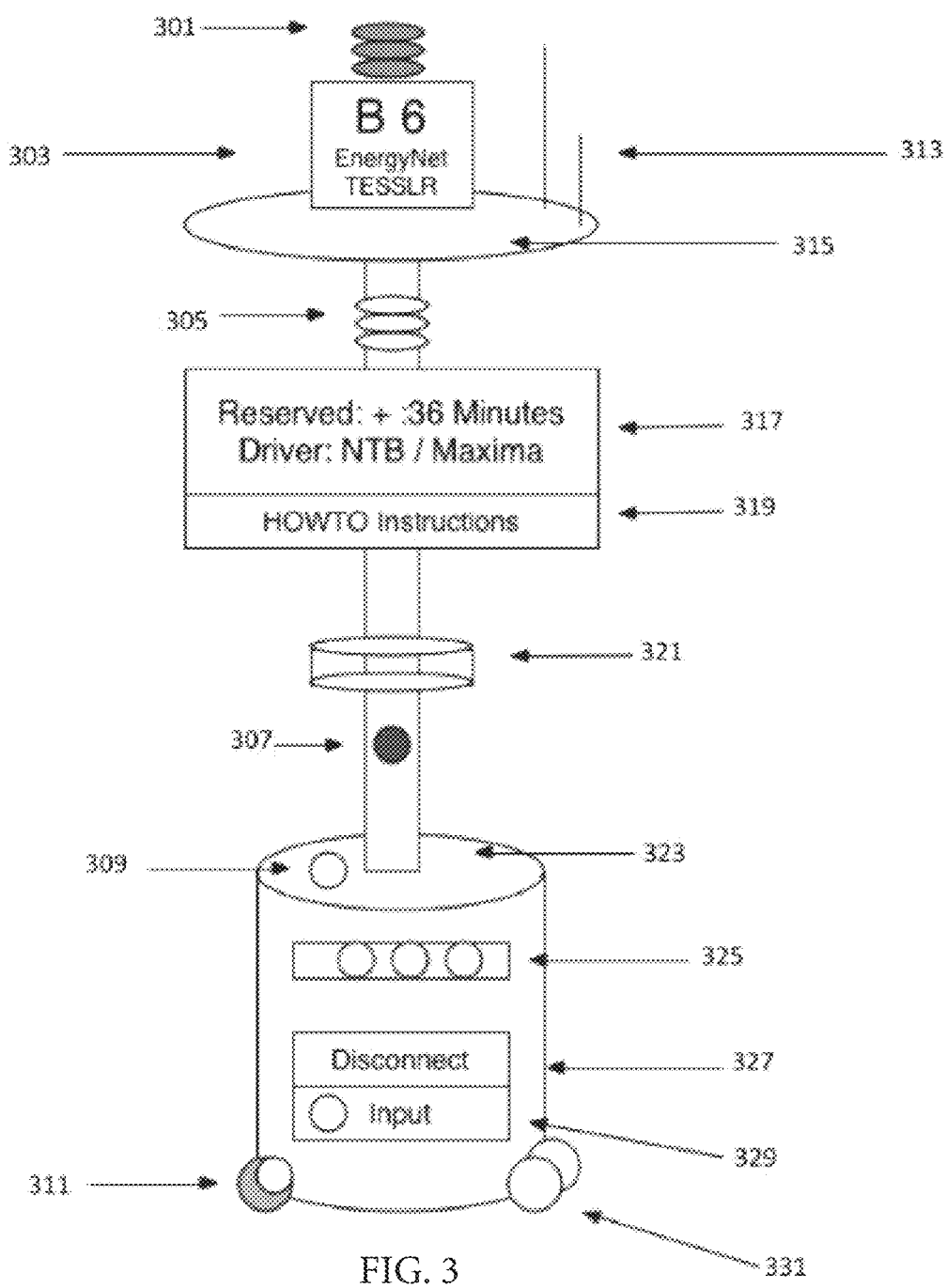
FIG. 3 is a schematic diagram of one embodiment of the invention including an EV charging terminal illustration.

FIG. 3 illustrates one embodiment of an EV charging terminal, which combines in a novel manner the electric meter and the parking meter into a network connected internet protocol (IP)-based network multimedia point of sale terminal to offer services to parked cars. In one embodiment, the industrial design of the EV charging terminal is 'tall' with a light on top, so you can see it from the back of the parking load/see it from the road; preferably the height is at least about 12 to about 36 inches tall, more preferably at least about 18 inches to about 30 inches tall so that it is visible easily from a driver seat position for the consumer user of EVs.

Light indicators 301 are preferably included as attached and/or integrated or otherwise connected with the EV charging terminal to make it visible from a distance, and also part of the 'branding' provides for the colors mean certain things. Red/Yellow/Green as Visual Signals: Green available, countdown of remaining time left. A wayfinding application may be provided or other means that are important to give drivers a sense that they are in the 'right spot' with obvious wayfinding/branding provided. Wayfinding/branding is provided via a wayfinding spot # and/or app logo 303 in one embodiment of the present invention. Antennas 313 (4G/Wifi and Internet connectivity) for point of sale, backhaul, reservation and scheduling, such as by way of example but not limitation, 4G, 3G, Cell Repeaters, Wifi B, N, G. Audio Notifications may come from an audio notification center 305 and may include Sirens, Attendant Call, Food orders, emergency support, including but not limited to Audio Signals/Alarms may be provided on the EV charging terminal. An Optional Solar PV Array 315 may be further included and/or integrated with the EV charging terminal. A Reservation Display Board 317 provides another confirmation that the vehicle is in the right spot, public information about user/car. A terms and conditions display 319 displays the terms and conditions for using the EV terminal. An emergency/safety button 307 is included in one embodiment of the present invention. In yet another embodiment of the present invention, a port 309 is provided for EV charging that allows users to bring their own plug or J1772. Preferably, the EV charging terminal is anchored using a physical anchor 311. A point of sale electrical meter IP multimedia gateway 321 is also preferably included in the EV terminal. Optionally, a battery storage compartment 323 is provided for battery storage inside the base of the EV terminal. In one embodiment, a video camera range sensor 325 is included. In yet another embodiment, a manual electrical safety disconnect 327 is included. Preferably, a supply connection for 120 V or 240 V 329 is included. In one embodiment, the EV terminal includes roll wheels 331 for hand truck movement.

Beyond merely charging for EV batteries, the systems and methods for EV charging terminal further eliminates any manual parking meter attendant function with an automated, network-based computerized system. The revenue potential from EV charging is minimal, ($500/year/car TOTAL, which will mostly be spent at home). Retailers profit from 'Over the Top'/add on services, so therefore the electric power is provided without direct charge and instead assign value to the actual act of parking, not just charging. With the present invention, services are provided with methods and systems for automated parking services, by way of example and not limitation, a "GoGo Parking" subscription (or On-Demand) to pay a little and get a spot reserved with a 'seat number' like on Delta right by entrances, bathrooms (front of the plane).

Parking services to EV and Non-EV cars is provided. The present invention also provides a service for Non Electrics with additional EV charging as a feature later. Also, in embodiments of the present invention, Short term (1 hr), Long Term (Overnight) use case includes A/C/TV cab power, vehicle monitoring, security systems, and combinations thereof.

Also by way of example not limitation, while shopping, keep the children in the car with their iPads, games, etc and good internet. While on truck rest, or other parking either short term and/or long term, users have access to internet, email, good cell coverage, Cab A/C. Boat metaphor: Some boats have Air Conditioners, but really only effective to run them at the marina while plugged into 'Shore Power'. Parking validation with purchase by certain retailers is provided. Advertising/recommendation channel for retailer services and parking locations is also provided.

Regarding enforcement for reservations, empty, reserved spots that you can't park in will get people's attention. Auto-ticketing/Auto-tow notification, which would function to automatically create an embarrassing, flashing, photo snap, auto ticketing situation that would be shameful for your car to be caught there, e.g., flashing red lights, sirens. This functionality is ideally suited for any business or retail shop that has parking issues The EV charging terminal functions as a grid element within an electric power grid wherein the electric power is provided by a generator, such as a utility or market participant, or by an off-grid power source, such as a diesel fuel generator, back-up generator, renewable power such as solar and/or wind, and includes a revenue grade meter, a plug or adaptor for removable connection to the EV, and an identification scheme including at least one consumer profile and/or EV profile, and a charging terminal profile associated with the revenue grade meter, wherein the EV charging terminal is preferably constructed and configured for network-based communication. The identification scheme may require inputs receivable by the EV charging terminal such as wireless or near-field communication by a mobile computing device and/or the EV, and/or identification card with magnetic swipe or other contact or contactless mobile data storage inputs.

The consumer profile, EV profile, and EV charging terminal profile are confirmed by matching geodetic information at the time of initiating a charge and/or initiating a reservation for EV charging at a predetermined EV charging terminal. The consumer profile includes account information, further including financial account information that defines the billing relationship within the energy financial settlement network and/or processor, including electronic bank draft, credit, debit, bill-me-later, prepayment, and combinations thereof, with authorization confirmation by the consumer. The EV profile includes the make and model and year of the EV, odometer information, time from last charge, amount of charge required, location-based information further including GPS location, GPS programming for travel route, home base of operation, service information, and combinations thereof.

Consuming RTUs or revenue grade meters are provided at the EV charging terminals, and billing information is sent in a loop with the marketing message where the consumer has opted in or provided authorization for use of consumer and/or EV profile for marketing and/or advertising purposes. Ingress could also deliver control messages to the devices/sensors; it would preferably use the same platform for controls and marketing messages.

The EV charging terminals may be positioned at home or foreign locations, with respect to the EV profile and its home location, i.e., its base location; the EV consumer automatically registers at the charging station; additional information is provided including but not limited to indicating how much electric power is consumed for the charge, or polling metrology device is provided with the EV charging terminal to collect a start and a stop for the amount of energy consumed. Billing information exchanged through the network.

Certain modifications and improvements will occur to those skilled in the art upon a reading of the foregoing description. For example, the EV charging terminals and GUIs for the systems and methods of the present invention described hereinabove provide for electric charging of the mobile battery in the EV without the involvement of any utility, i.e., an energy financial settlements network using a settlement processor in communication with the server computer of the EV system provides for financial settlement of the electric power consumed for any and all charges without using a consumer credit card for electronic payment, and without associating the charges with a separate utility billing statement for the consumer. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for managing electric vehicle (EV) charging comprising:
    an EV charging station and a user device in communication with a server computer;
    wherein the EV charging station comprises a revenue grade electric meter configured for network-based communication with an EV;
    wherein the EV charging station is operable to communicate via network-based communication to the user device and/or the EV an amount of electric power consumed by the EV and/or a cost of the amount of electric power consumed by the EV;
    wherein the server computer is operable to collect data from the EV charging station and the user device;
    wherein the server computer is in network communication with the user device via an application program on the user device, wherein the application program comprises an interactive graphical user interface (GUI);
    wherein the user device is in communication with the EV, wherein the EV includes an EV profile;
    wherein the user device including an interactive interface is operable for displaying information related to the EV charging station, collecting EV profile data, and operable for receiving inputs via the interactive GUI, wherein the inputs are automatically associated with the user profile;
    wherein the information related to the EV charging station includes an EV charging station profile, the EV charging station profile including real-time or near real-time energy consumption patterns, wherein the real-time or near real-time energy consumption patterns indicate opportunities for up selling, down selling, and/or cross selling;
    wherein the information related to the EV charging station further includes data from the EV charging station which indicates that the EV charging station is inefficient, defective, and/or requires updating to meet current standards;
    wherein the user profile includes user profile data comprised of user information and geodetic information, wherein the geodetic information includes an EV location identifier and a location identifier for the user device location identifier, and wherein the user information includes a unique user identifier, an EV identifier, user financial account information, historical data including data relating to EV charging, EV location, EV mileage, EV status, EV systems, transactions relating to EV activities, and transactions relating to EV and/or non-EV activities, and combinations thereof;
    wherein the EV profile data comprises the make, the model, and/or the year of the EV, odometer information, time from last charge, an amount of charge required, location-based information including Global Positioning System (GPS) location, GPS programming for travel route, home base of operation, and service information, and combinations thereof;
    wherein the server computer is operable to collect the user profile data and the EV profile data;
    wherein the server computer is operable to determine an EV charging destination based on the user profile data, the EV profile data, and the EV charging station;
    wherein the server computer is operable to determine advertising information for a merchant associated with or proximal to the EV charging destination based on the user profile data; and
    wherein the interactive GUI is operable to display the advertising information;
    and wherein the GUI automatically provides the price at the EV charging station for charging an EV per unit or for charging an EV for a total charge.

2. The system of claim 1, wherein the user device is a smartphone, a tablet computer, a personal computer, a personal digital assistant, a mobile communication device, a mobile phone, a cell phone, a laptop computer, a netbook, a terminal, or any other computing device suitable for network connection with the server computer or a cloud-based computing system.

3. The system of claim 1, wherein the interactive GUI interface automatically provides information about the EV charging station within a predetermined proximity of the location of the user device, including the location of the EV charging station within the predetermined proximity of the location of the user device, the availability of the EV charging station within the predetermined proximity of the location of the user device for a predetermined period of time, and/or combinations thereof.

4. The system of claim 1, wherein the inputs include a reservation for charging an EV at the EV charging station, a reservation for an Internet access point associated with the EV charging station, a reservation for air conditioning associated with the EV charging station, a reservation for television service associated with the EV charging station, a reservation for cab power associated with the EV charging station, a reservation for EV monitoring associated with the EV charging station, a reservation for security systems associated with the EV charging station, and/or combinations thereof, wherein the reservations are for a predetermined period of time.

5. The system of claim 1, wherein the merchant is charged for the marketing and/or advertising information displayed about the merchant on the interactive interface GUI.

6. A system for electric vehicle (EV) charging comprising:
an EV charging terminal configured for network-based communication with a user device and an EV, wherein the EV charging terminal includes a revenue grade electric meter, a plug and/or adaptor for removable connection to the EV, and an identification scheme including a user profile and/or an EV profile, wherein the EV charging terminal is in network-based communication with a server computer, wherein the EV charging terminal is associated with a revenue grade electric meter and a charging profile, wherein the charging profile is comprised of geodetic information at the time of initiating a charge and/or initiating a reservation for EV charging and real-time or near real-time energy consumption patterns, wherein the EV charging terminal functions as a grid element within an electric power grid;
wherein the user device is in network communication with the server computer via an application program provided by the server computer, wherein the application program comprises an interactive graphical user interface (GUI);
wherein the user profile associated with the at least one user device comprises user information including a unique user identifier, an EV identifier, user financial account information, historical data including data relating to EV charging, EV location, EV mileage, EV status, EV systems, transactions relating to EV activities, and transactions relating to non-EV activities;
wherein the server computer is operable to determine advertising information for a merchant associated with or proximal to the EV charging terminal based on the user profile; and
wherein the interactive GUI is operable to display the advertising information; wherein the EV charging terminal includes a marketing database for delivering marketing messages, analytics, and advertisements to a user and/or the user device including marketing and advertising information about merchants associated with or proximal to the EV charging terminal.

7. The system of claim 6, wherein the EV profile includes the make, the model, and/or the year of the EV, odometer information, the time from last charge, an amount of charge required, location-based information including GPS location, GPS programming for travel route, home base of operation, and/or service information, and combinations thereof.

8. The system of claim 6, wherein the EV charging terminal further includes an indicator light, wherein the indicator light is positioned near the top of the EV charging terminal and is operable to include branding, indicate a status of the EV charging terminal, and/or indicate EV charging terminal violations.

9. The system of claim 6, wherein the EV charging terminal is operable to accept a reservation for charging the EV for a predetermined period of time.

10. The system of claim 9, wherein the reservation further includes a reservation for a parking space, air conditioning, television service, cab power, EV monitoring, security systems, and/or combinations thereof for a predetermined period of time.

11. The system of claim 9, wherein the EV or the user device includes a location-based indicator, wherein the EV charging terminal is operable to communicate with the location-based indicator, and upon determining that the location-based indicator is within a predetermined distance of the EV charging terminal, the EV, the EV charging terminal, and/or the user device is operable to emit a confirmation indicating that the EV is at the reserved EV charging terminal.

12. The system of claim 11, wherein the confirmation includes an audio confirmation and/or a visual confirmation, the audio confirmation including a siren and/or an attendant call and the at least one visual confirmation including a reservation display board and/or an indicator light located on the EV charging terminal.

13. The system of claim 9, wherein the EV charging terminal is operable to send an auto-ticketing and/or an auto-towing notification to the user, wherein the auto-ticketing notification and/or the auto-towing notification is sent to the user upon expiration of the predetermined period of time and/or in response to a reservation violation including a reserved spot being occupied by an EV other than an EV which placed the reservation.

14. The system of claim 13, wherein the EV charging terminal includes a camera, a light source operable to flash, and/or an automated ticket dispenser, wherein the auto-ticketing and/or the auto-towing notification includes the camera taking a photograph of the EV, the light source flashing, and/or the automated ticket dispenser dispensing a ticket.

15. The system of claim 6, wherein the EV charging terminal is operable to communicate via network-based communication to the user device and/or the EV an amount of electric power consumed by the EV and/or a cost of the amount of electric power consumed by the at least one EV with the user device and/or the EV.

16. A method of electric vehicle (EV) charging comprising the steps of:
a user device initiating an EV charging transaction at an EV charging terminal configured for network-based communication with the user device and/or an EV and including a revenue grade electric meter, wherein the initiation includes the EV charging terminal matching geodetic information with a consumer profile and/or an EV profile, wherein the user device is in network communication with a server computer via an interactive graphical user interface (GUI), wherein the consumer profile comprises a unique user identifier, an EV identifier, user financial account information, historical data including data relating to EV charging, EV location, EV mileage, EV status, EV systems, transactions relating to EV activities, and transactions relating to non-EV activities;

the EV charging terminal providing an amount of electric power to the EV upon initiation of the EV charging transaction;

the user paying for device performing the EV charging transaction from the user device with the EV charging terminal, wherein the user device is associated with the consumer profile and/or the EV profile; and the user device receiving marketing messages, analytics, and advertisements including marketing and advertising information about merchants associated with or proximal to the EV charging terminal and displaying advertising information for a merchant associated with or proximal to the EV charging terminal based on the customer profile via the interactive GUI.

17. The method of claim 16, wherein the consumer profile and/or the EV profile includes payment information, the payment information including an electronic bank account, a credit card account, a debit card account, a prepaid account, and combinations thereof, the method further comprising the step of the user authorizing payment using the payment information before and/or during paying for the EV charging transaction.

18. The method of claim 16, further comprising the step of the user making a reservation for the EV charging terminal for a predetermined period of time prior to the user initiating the EV charging transaction.

19. The method of claim 18, wherein the reservation includes reserving a parking space associated with the EV charging terminal for a predetermined period of time.

20. The method of claim 18, wherein the reservation includes reserving access to an Internet access point, air conditioning, television service, cab power, EV monitoring, security systems, and/or combinations thereof for a predetermined period of time.

21. The method of claim 18, wherein the EV or the user device includes a location-based indicator, wherein the EV charging terminal is operable to communicate with the location-based indicator, further comprising the steps of:
determining that the location-based indicator is within a predetermined distance of the EV charging terminal; and
the EV charging terminal, the EV, and/or the user device emitting a confirmation indicating that the EV is at the reserved EV charging terminal.

22. The method of claim 21, wherein the confirmation includes an audio confirmation and/or a visual confirmation, the audio confirmation including a siren and/or an attendant call and the visual confirmation including a reservation display board and/or an indicator light located on the EV charging terminal.

23. The method of claim 16, further comprising the step of the EV charging terminal communicating via network-based communication an amount of electric power consumed by the EV and/or a cost of the amount of electric power consumed by the EV with the user device and the EV.

24. The method of claim 16, further comprising the step of sending an auto-ticketing and/or an auto-towing notification to the user, wherein the auto-ticketing notification and/or the auto-towing notification is sent to the user upon expiration of the predetermined period of time and/or in response to a reservation violation including a reserved spot being occupied by an EV other than an EV which placed the reservation.

25. The method of claim 24, wherein the EV charging terminal includes a camera, a light source operable to flash, and/or an automated ticket dispenser, wherein the auto-ticketing and/or the auto-towing notification includes the camera taking a photograph of the EV, the light source flashing, and/or the automated ticket dispenser dispensing a ticket.

26. The system of claim 1, wherein the server computer is operable to process the user profile data, the EV profile data, and data from the EV charging station and provide for financial settlement of electric power consumed, marketing and advertising information about merchants associated with or proximal to the EV charging station, and/or non-EV activities.

27. The system of claim 6, wherein electric power for the EV charging terminal is provided by an off-grid power source including a diesel fuel generator, a back-up generator, and/or renewable power.

28. The system of claim 1, wherein the user device is operable to receive and display a message including a location of a closest EV charging terminal and a corresponding rate of charging via the interactive GUI.

29. The system of claim 1, wherein the EV is operable to opt-in of an EV profile in response to real-time changes in price of electric power.

30. The system of claim 6, wherein the GUI automatically provides a price for charging an EV per unit or a price for charging an EV for a total charge at the EV charging terminal.

* * * * *